United States Patent
Dos Reis et al.

(10) Patent No.: US 10,169,106 B2
(45) Date of Patent: Jan. 1, 2019

(54) METHOD FOR MANAGING CONTROL-LOSS PROCESSING DURING CRITICAL PROCESSING SECTIONS WHILE MAINTAINING TRANSACTION SCOPE INTEGRITY

(71) Applicant: International Business Machines Corporation, Armonk, NY (US)

(72) Inventors: Hong L. Dos Reis, New Paltz, NY (US); Christopher D. Filachek, Lagrangeville, NY (US); Mei Hui Wang, Brookfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 181 days.

(21) Appl. No.: 15/197,819

(22) Filed: Jun. 30, 2016

(65) Prior Publication Data

US 2018/0004579 A1    Jan. 4, 2018

(51) Int. Cl.
  *G06F 7/00*   (2006.01)
  *G06F 9/52*   (2006.01)
  *G06F 9/54*   (2006.01)

(52) U.S. Cl.
  CPC .............. *G06F 9/526* (2013.01); *G06F 9/546* (2013.01)

(58) Field of Classification Search
  None
  See application file for complete search history.

(56) References Cited

U.S. PATENT DOCUMENTS

| | | | |
|---|---|---|---|
| 6,647,510 B1 | 11/2003 | Ganesh et al. | |
| 6,862,664 B2 | 3/2005 | Trembly et al. | |
| 7,120,762 B2 | 10/2006 | Rajwar et al. | |
| 7,178,062 B1 * | 2/2007 | Dice | G06F 9/524 710/260 |
| 7,340,569 B2 * | 3/2008 | Goodman | G06F 9/3004 711/141 |
| 7,739,244 B2 | 6/2010 | Verma et al. | |
| 7,747,996 B1 * | 6/2010 | Dice | G06F 9/526 710/200 |
| 7,769,958 B2 * | 8/2010 | Kinter | G06F 12/0833 711/141 |
| 7,802,136 B2 | 9/2010 | Wang et al. | |
| 7,930,694 B2 | 4/2011 | Anderson et al. | |
| 8,407,455 B2 * | 3/2013 | Christie | G06F 9/466 711/147 |
| 8,533,699 B2 * | 9/2013 | Moir | G06F 9/467 717/151 |
| 8,713,371 B2 | 4/2014 | Williams et al. | |
| 9,342,380 B2 * | 5/2016 | Dice | G06F 9/467 |
| 9,612,757 B2 * | 4/2017 | Chakrabarti | G06F 3/0619 |

(Continued)

*Primary Examiner* — Cheng Yuan Tseng
(74) *Attorney, Agent, or Firm* — Cantor Colburn LLP; Teddi Maranzano

(57) ABSTRACT

According to one or more embodiments, a system and computer implemented method for managing critical section processing are provided. The method includes generating, using a processor, a transaction scope for a process in response to processing in a critical section, collecting data related to the process, generating, using the processor, a request using the collected data, storing the request and data as a pending item in a private storage during critical section processing, and processing, using the processor, the request based on the transaction scope.

11 Claims, 2 Drawing Sheets

(56) References Cited

U.S. PATENT DOCUMENTS

| | | | |
|---|---|---|---|
| 9,904,701 B2* | 2/2018 | Ou | G06F 17/30371 |
| 9,916,189 B2* | 3/2018 | Pohlack | G06F 9/52 |
| 2005/0216633 A1 | 9/2005 | Cavallo | |
| 2009/0288074 A1* | 11/2009 | Carroll | G06F 11/3466 |
| | | | 717/158 |
| 2011/0055493 A1* | 3/2011 | Kottapalli | G06F 9/528 |
| | | | 711/152 |
| 2011/0113221 A1* | 5/2011 | Vajda | G06F 9/4856 |
| | | | 712/30 |
| 2015/0277914 A1* | 10/2015 | Kelm | G06F 9/52 |
| | | | 712/226 |
| 2016/0246527 A1* | 8/2016 | Kogan | G06F 9/467 |
| 2017/0220474 A1* | 8/2017 | Dice | G06F 9/52 |

* cited by examiner

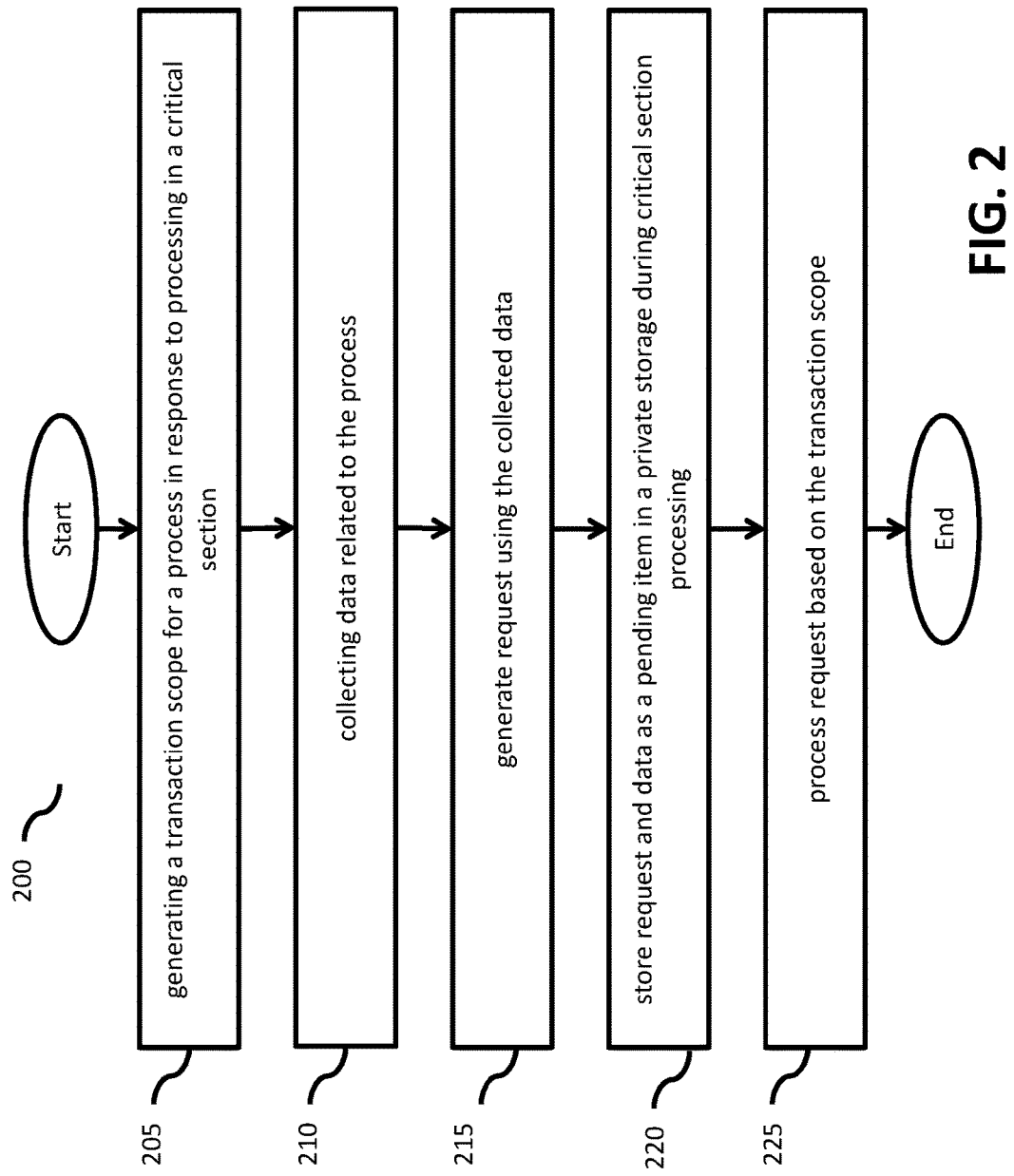

METHOD FOR MANAGING CONTROL-LOSS PROCESSING DURING CRITICAL PROCESSING SECTIONS WHILE MAINTAINING TRANSACTION SCOPE INTEGRITY

BACKGROUND

The present disclosure relates generally to processing during critical processing sections and, more specifically, to managing control loss when processing during critical processing sections.

For example, during file processing, critical sections of the file process are not allowed to lose control from an application point of view. This means the request to perform the file cannot lose control. For example, when a system files records out to disk new support may be provided to capture a copy of the record being filed and push a copy of that record out to event processing. In that example, copies of the original record are created, allowing the file process to not relinquish control. For example, one may file a copy to a local disk, and the system takes a copy of that and sends a copy of the record to one or more remote systems for archiving or analytics etc. Accordingly, any requests to file records within a transaction scope are kept pending within the transaction scope until the transaction scope is committed to disk. Only when the transaction scope is committed are all the held requests either committed to, or if a roll back is requested they can all be dropped.

Thus, as described above, while performing critical section processing it is sometimes the case that the critical section is not allowed loss of control. In addition, the file request may be performed within a transaction scope. This means that the critical section does not fully release any processed requests. Rather, the processed requests are held until the entire transaction scope is complete and are either selected to be committed or can be rolled back which causes all the requests to be discarded. Further, it can be the case that all supporting functions and processing invoked in the critical section may not lose control either. In some instances, the critical section may be very large, which may significantly restrict which supporting functions can be used and make it difficult to call other processing or functions.

One way to try and handle the processing is to push the collected data for the data event to a shared queue or list and have an asynchronous process continue processing the data event. However, this method would put the data event outside the control of the application transaction scope and the data event could still flow even if the application transaction scope is rolled back.

Another method is to delay creating the data event and collecting data until the application transaction scope is committed. Instead of recognizing a data event at the FILE API time, it would be recognized at commit time. However, the contextual data needs to be collected at the FILE API time and would no longer be available at commit time.

Accordingly, there is a desire to provide a method and system that can help processes during critical processing sections when relinquishing control is not desired.

SUMMARY

According to one embodiment a computer implemented method for managing critical section processing is provided. The method includes generating, using a processor, a transaction scope for a process in response to processing in a critical section, collecting data related to the process, generating, using the processor, a request using the collected data, storing the request and data as a pending item in a private storage during critical section processing, and processing, using the processor, the request based on the transaction scope.

In addition to one or more of the features described above, or as an alternative, further embodiments may include, wherein the data includes, at least one from a group consisting of contextual data, a file address, a filing program, and a timestamp.

In addition to one or more of the features described above, or as an alternative, further embodiments may include, wherein storing the request and data as the pending item includes saving an address of the pending item in a known location in a memory that is provided locally.

In addition to one or more of the features described above, or as an alternative, further embodiments may include, wherein storing the request and data as the pending item includes storing a plurality of requests and data in a plurality of pending items, and wherein the plurality of pending items are chained together to form an ordered list.

In addition to one or more of the features described above, or as an alternative, further embodiments may include, wherein the pending items are processed in the order they are created by using the ordered list.

In addition to one or more of the features described above, or as an alternative, further embodiments may include, wherein a system implementing the computer implemented method returns to normal processing once complete removal of pending items and release of the private storage is provided.

In addition to one or more of the features described above, or as an alternative, further embodiments may include, wherein the request is a rollback request, wherein the rollback request includes at least one from a group consisting of removing the pending items from the private storage, releasing the private storage for all pending items, and resuming normal processing.

In addition to one or more of the features described above, or as an alternative, further embodiments may include, wherein processing, using the processor, the request based on the transaction scope includes implementing a check of the process for any pending items in response to a transaction scope APIs being called or other processing relating to the pending items.

In addition to one or more of the features described above, or as an alternative, further embodiments may include, wherein the transaction scope API includes at least one from a group consisting of a begin, commit, and rollback.

According to another embodiment a system to manage critical section processing is provided. The system including a memory having computer readable instructions, and a processor configured to execute the computer readable instructions, the computer readable instructions including generating, by the processor, a transaction scope for a process in response to processing in a critical section, collecting, by the processor, data related to the process, generating, by the processor, a request using the collected data, storing, by the processor, the request and data as a pending item in a private storage during critical section processing, and processing, by the processor, request based on the transaction scope.

In addition to one or more of the features described above, or as an alternative, further embodiments may include, wherein the data includes at least one from a group consisting of contextual data, a file address, a filing program, and a timestamp.

In addition to one or more of the features described above, or as an alternative, further embodiments may include, wherein storing the request and data as the pending item includes saving an address of the pending item in a known location in a memory that is provided locally.

In addition to one or more of the features described above, or as an alternative, further embodiments may include, wherein storing the request and data as the pending item includes storing a plurality of requests and data in a plurality of pending items, and wherein the plurality of pending items are chained together to form an ordered list.

In addition to one or more of the features described above, or as an alternative, further embodiments may include, wherein the pending items are processed in an order that they are created by using the ordered list.

In addition to one or more of the features described above, or as an alternative, further embodiments may include, wherein the request is a rollback request, wherein the rollback request includes at least one from a group consisting of removing the pending items from the private storage, releasing the private storage for all pending items, and resuming normal processing.

In addition to one or more of the features described above, or as an alternative, further embodiments may include, wherein processing, using the processor, the request based on the transaction scope includes implementing a check of the process for any pending items in response to a transaction scope APIs being called or other processing relating to the pending items, wherein the transaction scope API includes at least one from a group consisting of a begin, commit, and rollback.

According to another embodiment, a computer program product to manage critical section processing, the computer program product including a computer readable storage medium having program instructions embodied therewith is provided. The program instructions executable by a processor to cause the processor to generate, using a processor, a transaction scope for a process in response to processing in a critical section, collect data related to the process, generate, using the processor, a request using the collected data, store the request and data as a pending item in a private storage during critical section processing, and process, using the processor, the request based on the transaction scope.

In addition to one or more of the features described above, or as an alternative, further embodiments may include saving an address of the pending item in a known location in a memory that is provided locally.

In addition to one or more of the features described above, or as an alternative, further embodiments may include, wherein the storing the request and data as the pending item includes storing a plurality of requests and data in a plurality of pending items, and wherein the plurality of pending items are chained together to form an ordered list.

In addition to one or more of the features described above, or as an alternative, further embodiments may include processing, using the processor, the request based on the transaction scope, and implementing a check of the process for any pending items in response to a transaction scope APIs being called or other processing relating to the pending items.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 depicts a process flow of a method in accordance with one or more embodiments of the present disclosure.

DETAILED DESCRIPTION

Figure 1:
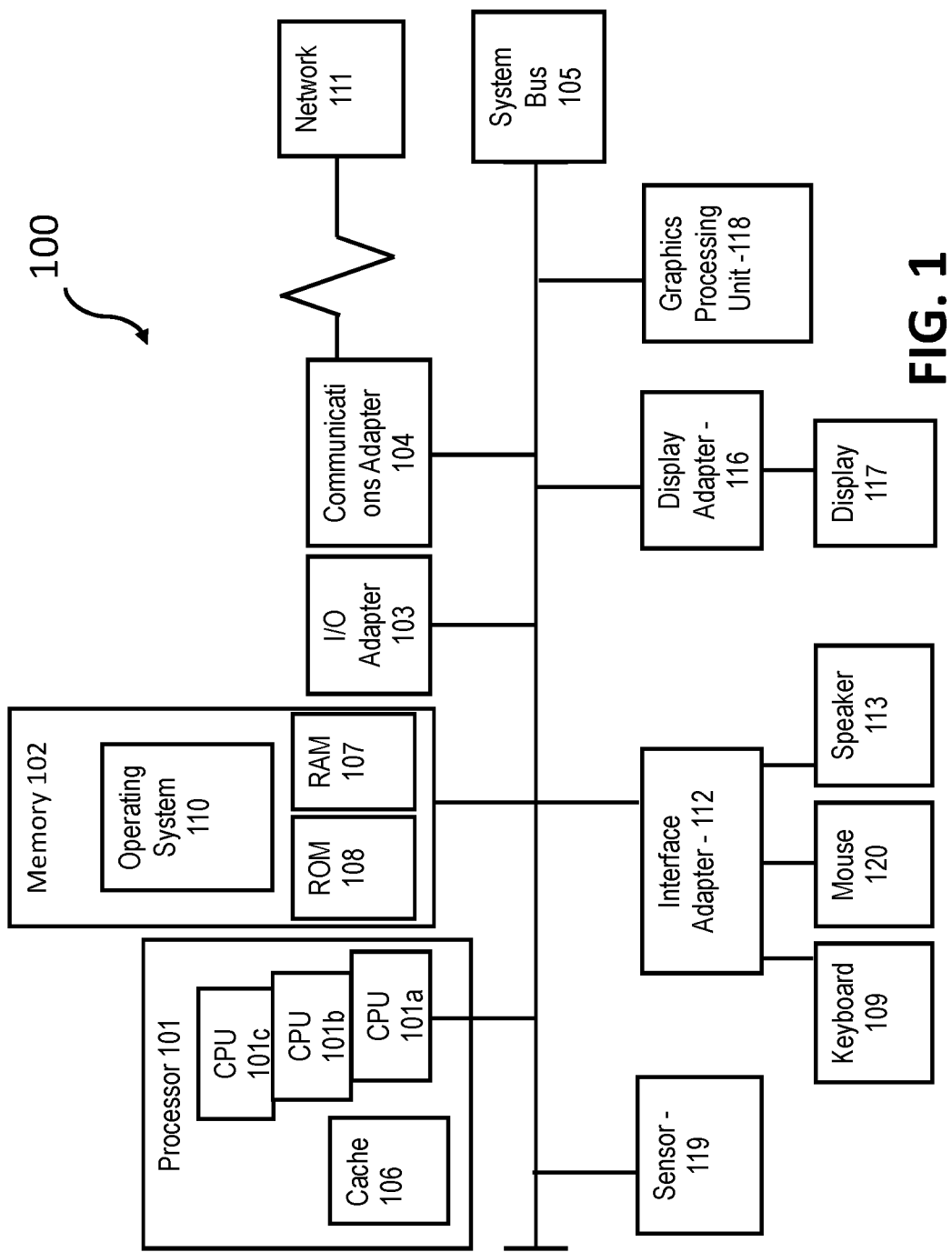
FIG. 1 depicts a block diagram of a computer system for use in practicing the embodiments described herein in accordance with some embodiments of this disclosure.

As shown and described herein, various features of the disclosure will be presented. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Turning now to FIG. 1, an electronic computing device 100, which may also be called a computer system 100, that includes a plurality of electronic computing device sub-components is generally shown in accordance with one or more embodiments. Particularly, FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Communications adaptor 104 may be operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 120, speaker 113, etc. System bus 105 may also connect display adaptor 116 and display 117 to processor 101. Processor 101 may also be operatively connected to graphical processing unit 118.

Further, the computer 100 may also include a sensor 119 that is operatively connected to one or more of the other electronic sub-components of the computer 100 through the system bus 105. The sensor 119 can be an integrated or a standalone sensor that is separate from the computer 100 and may be communicatively connected using a wire or may communicate with the computer 100 using wireless transmissions.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 110. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 120. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 110, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

According to one or more embodiments, any one of the electronic computing device sub-components of the computer 100 includes a circuit board connecting circuit elements that process data. Accordingly, a method for managing critical section processing may be implemented using the circuit boards between the circuit elements, or within the circuit elements, or in combination with any of the electronic computing device sub-components to form one or more of the different data paths available in the system.

Embodiments described herein are directed to collecting all required data and saving the data as a pending item in private storage in this process during critical section processing. Therefore, in accordance with one or more embodiment, when any transaction scope APIs are called (begin, commit, rollback, etc.) or other processing relating to the pending items, a check of the process for any pending items is implemented. If any pending items exist in the private storage, complete processing for the pending items before continuing with the requested function is performed. By processing the pending items before the requested function starts work, the pending items are added to the current commit scope or rolled back as needed. In addition, the order of pending items can be preserved by keeping them in an ordered list.

For example, according to one or more embodiments, in a z/TPF operating system, the FILE API causes a record to be filed to disk from the private storage. The FILE API then puts the file request on a queue and returns to the application without giving up control. Existing customer applications currently rely on this behavior in certain situations. For example, they may file records inside of a LOCKC scope, where the LOCKC is a z/TPF synchronization mechanism that does not allow the process to give up control inside the scope. If the FILE API were to change behavior and give up control, applications would start experiencing errors when executing FILE APIs inside of the LOCKC scope. In this example, the entire FILE API processing can be considered a critical section because it cannot lose control.

In the case of data events for z/TPF files, all necessary data needs to be captured at the time of the FILE API, which includes the data being filed and any contextual information for that data or data such as file address, filing program, timestamp, etc. While the data being filed and the contextual information can easily be collected during FILE API processing, the collected data cannot be immediately sent to the data event processing infrastructure. This is because the data event infrastructure uses a queue, for example, Websphere MQ queues, to manage queuing and dispatching, and adding the data event to a queue may cause a loss of control, which will cause errors if done during FILE API processing. According to an embodiment, the queue can be a remote, non-local, queue. Therefore, in accordance with one or more embodiments, the collected contextual information can be stored in the private storage until it is ready to be processed.

In addition to honoring the restrictions of processing in the critical section, the application transaction scope is also to be honored if applicable according to one or more embodiments. For example, in the case of data events for z/TPF files, the application transaction scope should be honored. Specifically, if the transaction scope is rolled back, the FILE is not done and the data event must be rolled back as well. The data event is only allowed to flow if the transaction scope and thus the FILE request are committed.

According to one or more embodiments, when the system files data out to disc, the system can put in support to capture a copy of that record. Further, the system is configured such that the system can get a copy during file processing and send out to other system for archiving or analytics.

Referring now to FIG. 2, an embodiment of a method for managing critical section processing is provided. The method 200 includes generating a transaction scope for a process in response to processing in a critical section (operation 205). The method 200 also includes collecting data related to the process (operation 210). Further, the method 200 includes generating a request using the collected data (operation 215). The method also includes storing the request and data as a pending item in a private storage during critical section processing (operation 220). According to another embodiment, the private storage can represent an ordered list. Further, the method 200 includes processing the request based on the transaction scope (operation 225). For example, according to one or more embodiments, processing can include rollback which is defined as throwing away pending items, and/or the processing can include other transaction scope APIs that add to the transaction scope. Additionally, according to one or more embodiments these processing actions are done at the very beginning of the transactions scope API processing.

According to one or more embodiments, while processing in a critical section a function or process may need to be performed that cannot be completed inside the critical section. Accordingly, when this condition is present a method is implemented to help accomplish the processing during this critical time. Specifically, the method begins with a collection of all required data. For data events for z/TPF files, this is the data being filed plus any contextual data or file address, filing program, timestamp, etc. Further, the method stores the collected data as a pending item in private storage for this process. Then, the method and system save the address of the pending item in a known location in the process memory that is provided locally. If multiple pending items are present, the pending items are chained together to form an ordered list. By using an ordered list, the pending items can be processed in the order they are created. At this point, the system can resume normal processing Further, according to one or more embodiments, when a transaction scope API or function related to the pending items is invoked, previously stored pending items are processed in the ordered they were stored which is done prior to performing any of the requested function. In the case of data events for z/TPF files, the functions related to the pending items are other data event functions, which include signal events and data events for z/TPF.

For example, according to one or more embodiments, if the transaction scope is a begin, commit, or function related to the pending items and pending items exist for this process then the pending items for this process are in an ordered list. Starting with the oldest pending item, processing of each pending item is done as needed.

In the case of data events for z/TPF files, this means constructing a data event from the collected data and adding it to the Websphere MQ queue for dispatch processing. By processing them in order, the pending items are processed in the order they are created and are also processed before new items that may be created by a related function. In the case of data events for z/TPF files, this means the pending data events are added to the queue before the new signal event or new data event for z/TPFDF, preserving the order of events created by this process.

Further, according to one or more embodiments, once complete removal of the "pending items" from the process (set no pending items present) is provided as well as releasing the private storage for all "pending items." Accordingly the system resumes normal processing.

Further, according to one or more embodiments, if this is a transaction rollback request and "pending items" exist for this process then a few actions can be implemented. For example, removing the "pending items" from the process and set no pending items present. Further, another action that can be implemented includes releasing the private storage for all "pending items." Another action includes resuming normal processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A computer implemented method for managing critical section processing, the method comprising:
   generating, using a processor, a transaction scope for a process in response to processing in a critical section;
   collecting data related to the process;
   generating, using the processor, a plurality of requests using the collected data;
   storing the plurality of requests and data as a plurality of pending items chained together to form an ordered list in a private storage during critical section processing; and
   processing, using the processor, the request based on the transaction scope, the processing comprising implementing a check of the process for any pending items in response to a transaction scope application programming interface being called or other processing relating to the pending items,
   wherein the pending items are processed in the order they are created by using the ordered list, and
   wherein one of the plurality of requests is a rollback request that includes at least one from a group consisting of removing the pending items from the private storage, releasing the private storage for all pending items, and resuming normal processing.

2. The computer implemented method of claim 1, wherein the data includes, at least one from a group consisting of contextual data, a file address, a filing program, and a timestamp.

3. The computer implemented method of claim 1, wherein storing the request and data as the pending item includes:
   saving an address of the pending item in a known location in a memory that is provided locally.

4. The computer implemented method of claim 1, wherein a system implementing the computer implemented method returns to normal processing once complete removal of pending items and release of the private storage is provided.

5. The computer implemented method of claim 1, wherein the transaction scope application programming interface includes at least one from a group consisting of a begin, commit, and rollback.

6. A system to manage critical section processing, the system comprising:
   a memory having computer readable instructions; and
   a processor configured to execute the computer readable instructions, the computer readable instructions comprising:
   generating, by the processor, a transaction scope for a process in response to processing in a critical section;
   collecting, by the processor, data related to the process;
   generating, by the processor, a plurality of requests using the collected data;
   storing, by the processor, the plurality of requests and data as a plurality of pending items chained together to form an ordered list in a private storage during critical section processing; and
   processing, by the processor, request based on the transaction scope, the processing comprising implementing a check of the process for any pending items in response to a transaction scope application programming interface being called or other processing relating to the pending items,
   wherein the pending items are processed in the order they are created by using the ordered list, and
   wherein one of the plurality of requests is a rollback request that includes at least one from a group consisting of removing the pending items from the private storage, releasing the private storage for all pending items, and resuming normal processing.

7. The system claim 6, wherein the data includes at least one from a group consisting of contextual data, a file address, a filing program, and a timestamp.

8. The system claim 6, wherein storing the request and data as the pending item includes:
   saving an address of the pending item in a known location in a memory that is provided locally.

9. The system claim 6, wherein the transaction scope application programming interface includes at least one from a group consisting of a begin, commit, and rollback.

10. A computer program product to manage critical section processing, the computer program product comprising a non-transitory computer readable storage medium having program instructions embodied therewith, the program instructions executable by a processor to cause the processor to:
    generate, using a processor, a transaction scope for a process in response to processing in a critical section;
    collect data related to the process;
    generate, using the processor, a plurality of requests using the collected data;
    store the plurality of requests and data as a plurality of pending items chained together to form an ordered list in a private storage during critical section processing; and
    process, using the processor, the request based on the transaction scope, the processing comprising implementing a check of the process for any pending items in response to a transaction scope application programming interface being called or other processing relating to the pending items,
    wherein the pending items are processed in the order they are created by using the ordered list, and
    wherein one of the plurality of requests is a rollback request that includes at least one from a group consisting of removing the pending items from the private storage, releasing the private storage for all pending items, and resuming normal processing.

11. The computer program product of claim 10, comprising a computer readable storage medium having program instructions embodied therewith, the program instructions executable by a processor, further comprising:
    saving an address of the pending item in a known location in a memory that is provided locally.

* * * * *